US008726160B2

(12) United States Patent  
Lai et al.

(10) Patent No.: US 8,726,160 B2  
(45) Date of Patent: May 13, 2014

(54) METHOD FOR PROVIDING EXTENDED CONTENT AND SYSTEM USING THE SAME AND COMPUTER-READABLE RECORDING MEDIUM

(75) Inventors: Chih-Chun Lai, Taipei (TW); Yi-Chang Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 736 days.

(21) Appl. No.: 12/636,787

(22) Filed: Dec. 14, 2009

(65) Prior Publication Data

US 2011/0138281 A1   Jun. 9, 2011

(30) Foreign Application Priority Data

Dec. 8, 2009   (TW) ............................... 98141946 A

(51) Int. Cl.
  *G06F 3/00*    (2006.01)
  *G06F 3/048*   (2013.01)

(52) U.S. Cl.
  USPC ............ 715/719; 715/708; 715/738; 715/804

(58) Field of Classification Search
  CPC .................................. G06F 3/00; G06F 3/048
  USPC .................. 715/738, 708, 719, 804
  See application file for complete search history.

(56) References Cited

U.S. PATENT DOCUMENTS

| 2007/0162850 | A1* | 7/2007 | Adler et al. .................... 715/700 |
| 2007/0250533 | A1  | 10/2007 | Huang |
| 2008/0082922 | A1* | 4/2008 | Biniak et al. .................. 715/719 |
| 2008/0250319 | A1* | 10/2008 | Lee et al. ....................... 715/716 |
| 2009/0055742 | A1* | 2/2009 | Nordhagen .................... 715/716 |
| 2009/0217320 | A1* | 8/2009 | Aldrey ............................ 725/37 |
| 2009/0254931 | A1* | 10/2009 | Pizzurro et al. .................... 725/5 |
| 2010/0192219 | A1* | 7/2010 | Carvajal et al. ................. 726/19 |
| 2011/0178854 | A1* | 7/2011 | Sofer et al. .................... 705/14.4 |

FOREIGN PATENT DOCUMENTS

| CN | 101562723 | 10/2009 |
| CN | 101562802 | 10/2009 |
| TW | 200737954 | 10/2007 |
| TW | 200741646 | 11/2007 |
| TW | 200921539 | 5/2009 |
| TW | 200943962 | 10/2009 |

OTHER PUBLICATIONS

"Office Action of Taiwan Counterpart Application", issued on Oct. 3, 2013, p. 1-p. 6, in which the listed reference was cited.
"Office Action of China Counterpart Application", issued on Aug. 5, 2013, p. 1-p. 8, in which the listed references were cited.
"Office Action of Taiwan Counterpart Application", issued on Jan. 24, 2013, p. 1-p. 8, in which the listed references were cited.

* cited by examiner

*Primary Examiner* — Doon Chow
*Assistant Examiner* — Le Nguyen
(74) *Attorney, Agent, or Firm* — Jianq Chyun IP Office

(57) ABSTRACT

A content service system including a content metadata analyzer module, a widget information acquisition module, a widget administration module, and a widget engine module is provided. The content metadata analyzer module receives a first metadata corresponding to a multimedia content, and generates a widget request or a service metadata according to the first metadata. The widget information acquisition module acquires a widget information of a first widget according to the widget request or the service metadata. The widget administration module installs and executes the first widget according to the widget information, wherein the first widget plays an extended content corresponding to the multimedia content. A content service method and a computer-readable recording medium corresponding to the content service method are also provided.

13 Claims, 4 Drawing Sheets

METHOD FOR PROVIDING EXTENDED CONTENT AND SYSTEM USING THE SAME AND COMPUTER-READABLE RECORDING MEDIUM

CROSS-REFERENCE TO RELATED APPLICATION

This application claims the priority benefit of Taiwan application serial no. 98141946, filed on Dec. 8, 2009. The entirety of the above-mentioned patent application is hereby incorporated by reference herein and made a part of this specification.

BACKGROUND OF THE INVENTION

1. Field of the Invention

The present invention generally relates to a content service system and a method thereof and a computer-readable recording medium, and more particularly, to a content service system that automatically provides an extended content and a method thereof and a computer-readable recording medium.

2. Description of Related Art

Today, the information technology is dedicated to providing more interactive and personalized products. The recently risen concept of widget refers to a small customized network browser program that provides some simple functions through a simplified user interface. A widget is usually small and easy to be deployed therefore is always used for displaying multimedia contents (for example, films or e-books) subscribed by a user or for providing an interface such that the user can interact with a content provider.

However, when the user wants to obtain extended information of the multimedia content the user is viewing, such as information about a product appearing in a film, information about the filming site, or concert information of a singer, there is no such a service for automatically providing the extended content, and the user has to manually look for the extended information by himself/herself. Besides, the user cannot interact with a real-time content, such as a video/audio program or a TV show.

SUMMARY OF THE INVENTION

Accordingly, the present invention is directed to a content service system and a method thereof and a computer-readable recording medium, wherein an extended content corresponding to a multimedia content is automatically provided to a user.

The present invention provides a content service system including a content metadata analyzer module, a widget information acquisition module, a widget administration module, and a widget engine module. The content metadata analyzer module receives a first metadata corresponding to a multimedia content and generates a widget request or a service metadata according to the first metadata. The widget information acquisition module obtains a widget information of a first widget according to the widget request or the service metadata. The widget administration module installs and executes the first widget according to the widget information, wherein the first widget plays an extended content corresponding to the multimedia content. The widget engine module provides a program and an application programming interface (API) required by the first widget.

According to an embodiment of the present invention, the content metadata analyzer module obtains the first metadata from the multimedia content, a receiver for receiving the multimedia content, or a second widget.

According to an embodiment of the present invention, the content metadata analyzer module obtains the first metadata from the receiver, receives a second metadata from a content provider providing the multimedia content according to the first metadata, and analyzes the second metadata to generate the widget request or the service metadata, wherein the first metadata includes a current time and a channel number.

According to an embodiment of the present invention, the widget information acquisition module obtains the widget information from a widget provider according to the widget request or the service metadata.

According to an embodiment of the present invention, the widget administration module obtains the first widget directly from the widget information or from a widget provider according to the widget information.

According to an embodiment of the present invention, the first widget receives a product information from a product provider to display the extended content with the product information.

According to an embodiment of the present invention, the service metadata includes at least one of a channel number, a program list, a program information, a time, a user preference setting, a network setting, a real-time information, a product information, and a widget information. The widget information includes at least one of an ID, a download uniform resource locator (URL), an installation file, a description information, and a classification information.

According to an embodiment of the present invention, the multimedia content is in a digital format, and the first metadata is directly stored in the multimedia content.

According to an embodiment of the present invention, when the multimedia content is a digital TV stream, the first metadata is stored in an event information table (EIT) of the digital TV stream. When the multimedia content is an MP3 file, the first metadata is stored in an ID3 tag of the MP3 file. When the multimedia content is an MP4 file, the first metadata is stored in a moov atom or an udta atom of the MP4 file. When the multimedia content is a JPEG (short for "Joint Photographic Experts Group") file or TIFF (short for "Tagged Image File Format") file, the first metadata is stored in an EXIF (short for "Exchangeable Image File Format") tag or IPTC (short for "International Press Telecommunications Council") tag of the JPEG file or TIFF file. When the multimedia content is a PDF (short for "Portable Document Format") file, the first metadata is stored in a metadata stream of the PDF file.

The present invention also provides a content service method including following steps. A multimedia content is received from a wired network, a wireless network, a wired broadcasting system, a wireless broadcasting system, or a storage medium. The multimedia content is played on a player device. A widget request or a service metadata is generated according to a first metadata corresponding to the multimedia content. A widget information of a first widget is obtained according to the widget request or the service metadata. The first widget is installed and executed according to the widget information, wherein the first widget plays an extended content corresponding to the multimedia content on the player device.

According to an embodiment of the present invention, the content service method further includes obtaining the first metadata from the multimedia content, a receiver for receiving the multimedia content, or a second widget.

According to an embodiment of the present invention, the content service method further includes receiving a first metadata from the receiver, receiving a second metadata from a content provider providing the multimedia content according to the first metadata, and analyzing the second metadata to generate the widget request or the service metadata, wherein the first metadata includes a current time and a channel number.

According to an embodiment of the present invention, the content service method further includes obtaining the widget information from a widget provider according to the widget request or the service metadata.

According to an embodiment of the present invention, the first widget is obtained directly from the widget information or from a widget provider according to the widget information.

According to an embodiment of the present invention, in the content service method, the first widget receives a product information from a product provider to display the extended content with the product information.

The present invention further provides a computer-readable recording medium, wherein the computer-readable recording medium records a computer program for executing the content service method described above.

As described above, the present invention provides a content service system and a method thereof and a computer-readable recording medium, wherein an appropriate widget is automatically obtained according to the metadata corresponding to a multimedia content preferred by a user, so as to provide an extended content related to the multimedia content to the user. Besides, the widget allows the user to interact with the provider of the multimedia content.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
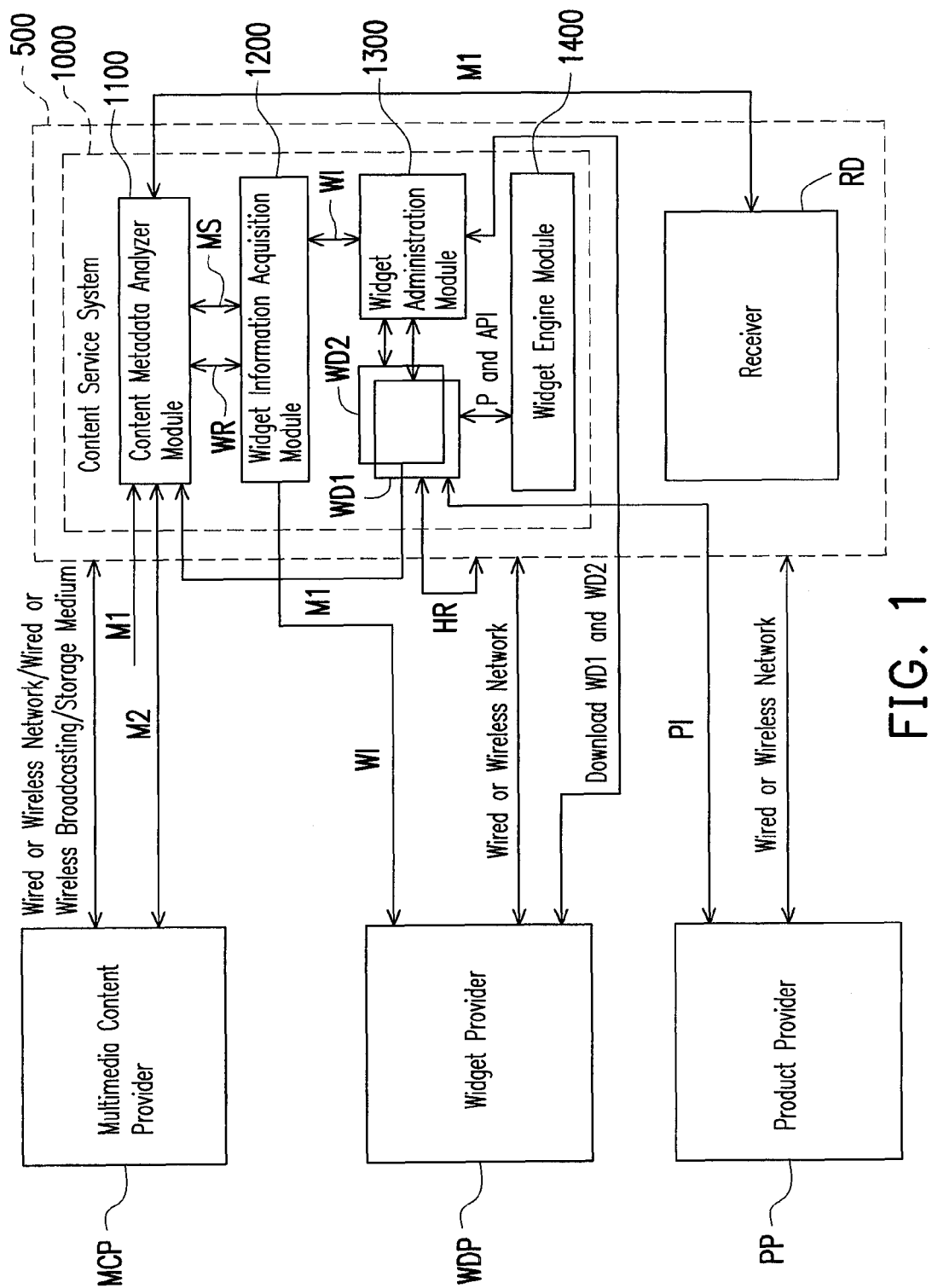
FIG. 1 is a diagram of a content service system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
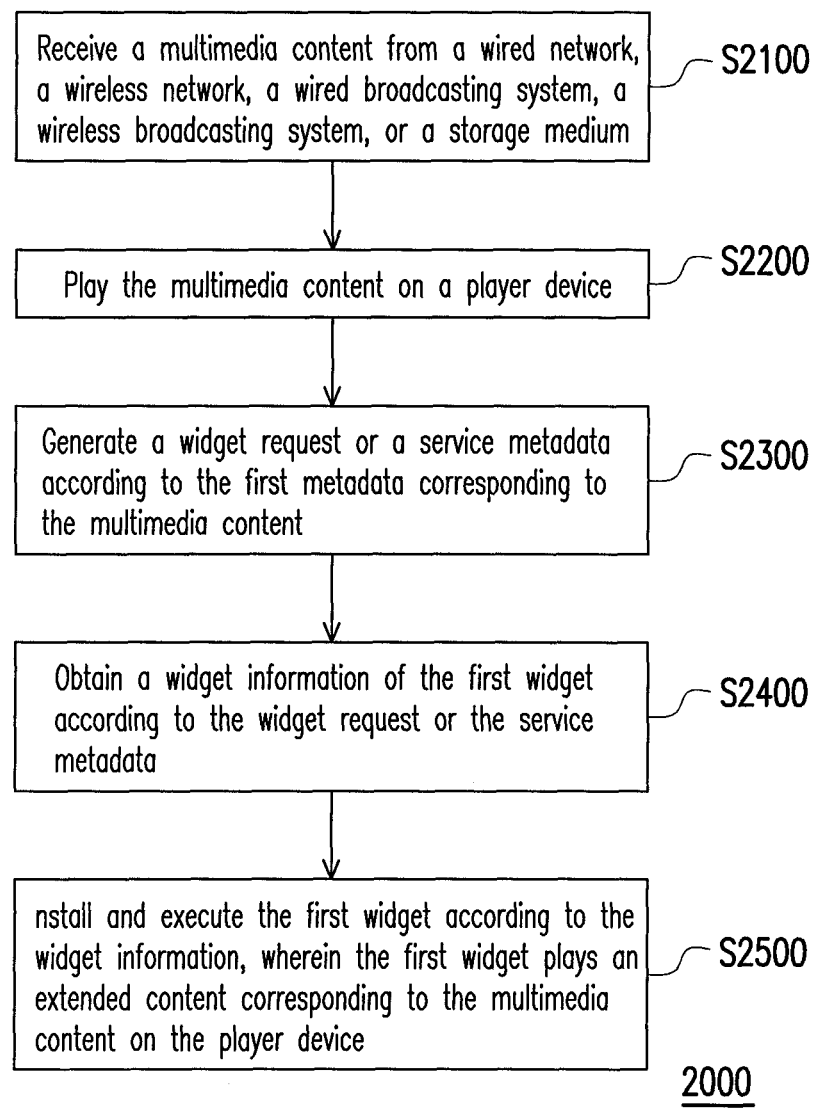
FIG. 2 is a flowchart of a content service method according to an embodiment of the present invention.

FIG. 1 is a diagram of a content service system according to an embodiment of the present invention. FIG. 2 is a flowchart of a content service method 2000 according to an embodiment of the present invention. Referring to FIG. 1 and FIG. 2, the content service method 2000 includes steps S2100-S2500. The multimedia content player device 500 includes a content service system 1000 and a receiver RD. The content service system 1000 includes a content metadata analyzer module 1100, a widget information acquisition module 1200, a widget administration module 1300, and a widget engine module 1400. The content service system 1000 may be implemented as a software or a hardware.

In step S2100, the receiver RD receives a multimedia content to be viewed by a user from a wired network, a wireless network, a wired broadcasting system, a wireless broadcasting system, or a storage medium. The multimedia content is provided by a multimedia content provider MCP, and which may be a TV program, a radio program, music, a film, an e-book, a digital photo, or an image. The storage medium may be a memory card, a flash drive, a hard disk, or a compact disk (CD). In step S2200, the player device 500 plays the multimedia content.

In step S2300, the content metadata analyzer module 1100 generates a widget request WR or a service metadata MS according to a first metadata M1 corresponding to the multimedia content viewed by the user. The first metadata M1 may be obtained directly from the multimedia content or from the receiver RD. The widget request WR may be a real-time interactive request of a TV program, and a widget installed according to this request allows the user to interact (for example, viewer vote) with the TV program in real time. The service metadata MS may include a channel number, a program list, a program information, a time, a user preference setting, a network setting, a real-time information, a product information, and/or a widget information WI. For example, the service metadata MS may include the filming location of a film or the information of a product appearing in the film.

In step S2400, the widget information acquisition module 1200 obtains the widget information WI of a first widget WD1 according to the widget request WR or the service metadata MS. The widget information WI may be obtained directly from the widget request WR or the service metadata MS, or the widget information WI may also be obtained from a widget provider WDP according to the widget request WR or the service metadata MS through a wired or wireless network. The widget information WI may include an ID, a download uniform resource locator (URL), an installation file, a description information, and/or a classification information of the first widget WD1.

In step S2500, the widget administration module 1300 obtains the installation file of the first widget WD1 directly from the widget information WI or from the widget provider WDP through a wired or wireless network according to the widget information WI. Next, the widget administration module 1300 installs and executes the first widget WD1, wherein the first widget WD1 plays an extended content corresponding to the multimedia content viewed by the user on the player device 500. The extended content may be an e-map of a film scene, an online shopping interface related to the film, or a real-time voting interface control tool. In addition, the widget administration module 1300 may also display the description information and the classification information of the first widget WD1 and ask the user whether to install the first widget WD1, and install and execute the first widget WD1 if the user agrees. The widget engine module 1400 provides a program P and an application programming interface (API) required for executing the first widget WD1.

In the present embodiment, the content service system 1000 and the content service method 2000 automatically obtain an appropriate widget according to the first metadata M1 corresponding to the multimedia content viewed by the user, so as to provide an extended content corresponding to the multimedia content to the user.

Figure 3:
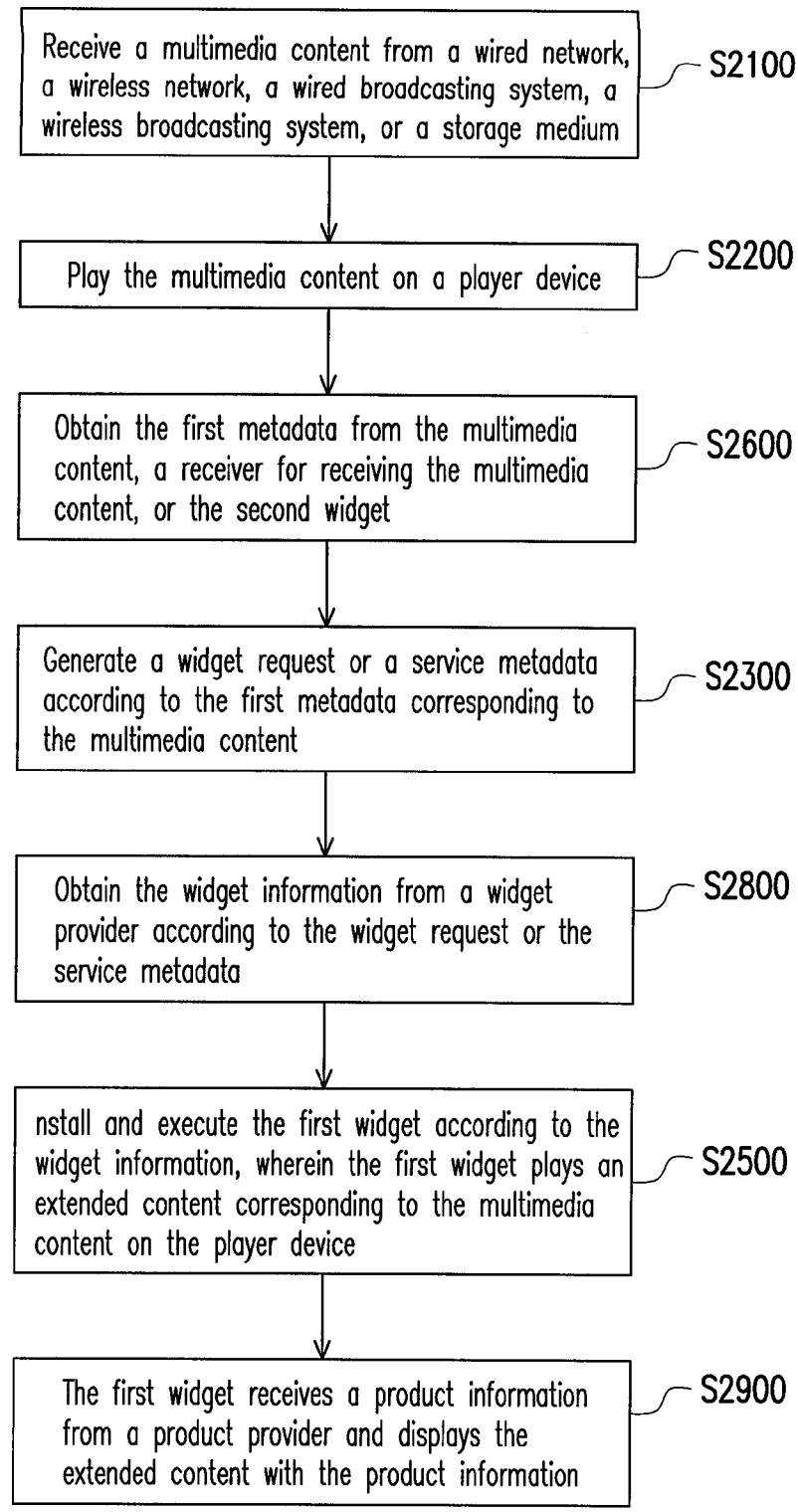
FIG. 3 is a flowchart of a content service method according to another embodiment of the present invention.

FIG. 3 is a flowchart of a content service method 3000 according to another embodiment of the present invention. Referring to FIG. 1 and FIG. 3, the content service method 3000 includes steps S2100-S2900. The steps S2100-S2300 and S2500 in FIG. 3 are the same as those in FIG. 2 therefore will not be described herein.

In the present embodiment, the installation file of the first widget WD1 takes up only a small space therefore is directly contained in the widget information WI. Accordingly, instead of obtaining the first widget WD1 from the widget provider WDP, the widget administration module 1300 obtains the first widget WD1 directly from the widget information WI.

In the present embodiment, the first widget WD1 may be evoked by a second widget WD2. For example, an e-map widget evokes a photo widget. Namely, regarding the same multimedia content, there is more than one widget for providing extended contents, and a first widget may evoke more widgets. Thus, in step S2600, the content metadata analyzer module 1100 obtains the first metadata M1 from the second widget WD2 that is executed earlier.

In the present embodiment, in step S2800, the widget information acquisition module 1200 obtains the widget information WI of the first widget WD1 from the widget provider WDP according to the widget request WR or the service metadata MS. The widget provider WDP may be a server, an online storage device, or an offline storage device.

The content service system 1000 is also applicable to a shopping street in a virtual channel. In step S2900, the first widget WD1 receives a product information PI from a product provider PP and displays the extended content with the product information PI. For example, a manufacturer or a user can display products through a widget in the content service system 1000, while other users can browse the product information PI and the corresponding extended content and purchase these products through the widget.

The content service system 1000 is also applicable to a real-time call-in program. For example, the content service system 1000 can provide extended content of a live show, invite a user to interact by using a widget, or even give award to a winning participant during commercial time.

The content service system 1000 is applicable to a digital TV stream. A digital TV stream is a multimedia content in digital format, and the first metadata M1 can be stored directly in the multimedia content and transmitted together with the multimedia content. The multimedia content may be a digital video broadcasting-terrestrial (DVB-T) transmission stream. Accordingly, in step S2600, the content metadata analyzer module 1100 obtains the first metadata M1 from the multimedia content. To be specific, when the multimedia content is a digital TV stream, the first metadata M1 is stored in an event information table (EIT) of the digital TV stream.

Accordingly, the content service system 1000 directly obtains the first metadata M1 from the multimedia content and automatically obtains an appropriate widget to provide the extended content corresponding to the multimedia content to the user.

Figure 4:
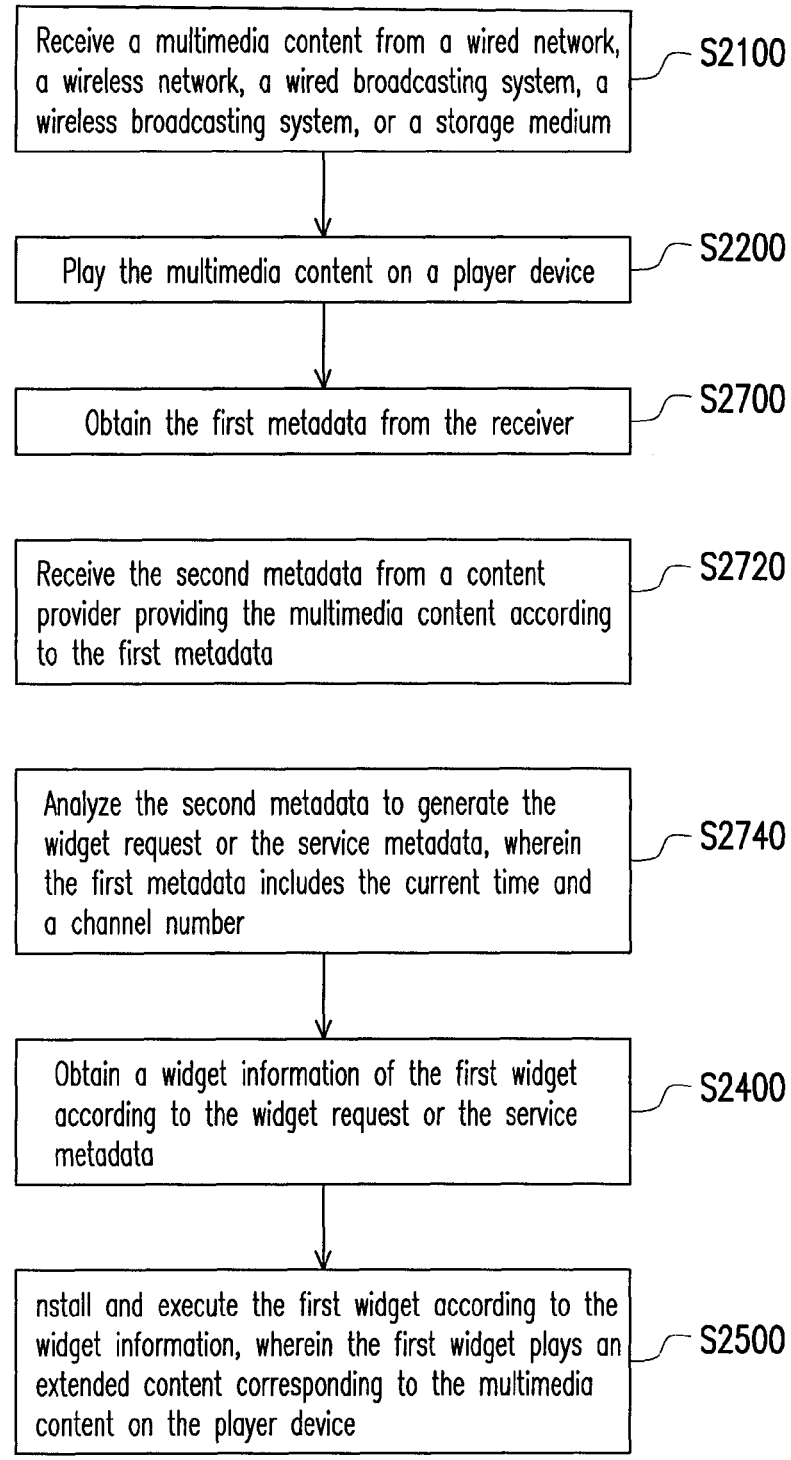
FIG. 4 is a flowchart of a content service method according to yet another embodiment of the present invention.

FIG. 4 is a flowchart of a content service method 4000 according to yet another embodiment of the present invention. Referring to FIG. 1 and FIG. 4. The content service method 4000 includes steps S2100-S2740. Steps S2100-S2200 and S2400-S2500 in FIG. 4 are the same as those in FIG. 2 therefore will not be described herein.

The content service system 1000 is also applicable to an analog TV stream or radio stream. Because the metadata is usually a digital signal, the analog TV stream cannot carry the digital metadata. Thus, in step S2700, the content metadata analyzer module 1100 obtains the first metadata M1 from the receiver RD. The receiver RD may be a set-top box, and the first metadata may include a current time and a channel number. Then, in step S2720, the content metadata analyzer module 1100 receives a second metadata M2 from a content provider MCP providing the multimedia content through the Internet according to the first metadata M1. The content provider MCP may be a TV station. Next, in step S2740, the content metadata analyzer module 1100 analyzes the second metadata M2 to generate the widget request WR or the service metadata MS.

It should be mentioned that the first widget WD1 may obtain the hardware resource HR of the player device 500 and play the extended content accordingly. For example, the first widget WD1 plays a high-resolution image when the player device is a high-performance one, and the first widget WD1 plays a low-resolution image when the player device is a low-performance one.

Thus, when the analog TV stream cannot carry a digital metadata or when the multimedia content is in a digital format and more metadata is required, through the receiver RD, the content service system 1000 and the content service method 4000 can obtain the second metadata M2 according to the first metadata M1 and then an appropriate widget can be automatically acquired so as to provide an extended content corresponding to the multimedia content to the user.

The content service system 1000 is also applicable to a multimedia file stream. The content service system 1000 automatically provides a corresponding extended content to the user according to the metadata in an image, a music, a film, or an e-book file stored in a storage medium, such as a flash drive, a hard disk, or a CD.

Thus, the content service system 1000 can cross multiple multimedia devices and automatically select an appropriate widget to provide the extended content corresponding to the multimedia content to the user.

It should be mentioned that when the multimedia content is an MP3 file, the first metadata M1 is stored in an ID3 tag of the MP3 file. When the multimedia content is an MP4 file, the first metadata M1 is stored in a moov atom or an udta atom of the MP4 file. When the multimedia content is a JPEG (short for "Joint Photographic Experts Group") file or TIFF (short for "Tagged Image File Format") file, the first metadata M1 is stored in an EXIF (short for "Exchangeable Image File Format") tag or IPTC (short for "International Press Telecommunications Council") tag of the JPEG file or TIFF file. When the multimedia content is a PDF (short for "Portable Document Format") file, the first metadata M1 is stored in a metadata stream of the PDF file.

In an embodiment of the present invention, a computer-readable recording medium is provided. The computer-readable recording medium records a computer program for executing the content service method described above.

As described above, the present invention provides a content service system and a method thereof and a computer-readable recording medium, wherein an appropriate widget is selected according to a first metadata corresponding to a multimedia content viewed by a user, and an extended content corresponding to the multimedia content is provided to the user. In addition, the content service system provides the extended content of a live show and invites a user to interact in real time. After that, the content service system provides services such as product listing, selling, and purchasing through the widget. Moreover, the content service system can still provide the extended content corresponding to the multimedia content to the user even though an analog TV stream cannot carry digital metadata. Furthermore, the content service system can cross multiple multimedia devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A content service system, comprising:
a content metadata analyzer module, for receiving a first metadata corresponding to a multimedia content and generating a widget request or a service metadata according to the first metadata, wherein the content metadata analyzer module obtains the first metadata from a receiver for receiving the multimedia content, receives a second metadata from a content provider providing the multimedia content according to the first metadata, and analyzes the second metadata to generate the widget request or the service metadata, wherein the first metadata comprises a current time and a channel number;
a widget information acquisition module, for obtaining a widget information of a first widget according to the widget request or the service metadata;
a widget administration module, for installing and executing the first widget according to the widget information, wherein the first widget plays an extended content corresponding to the multimedia content; and
a widget engine module, for providing a program and an application programming interface (API) required by the first widget,
wherein the multimedia content is in a digital format, and the first metadata is directly stored in the multimedia content, and when the multimedia content is a digital TV stream, the first metadata is stored in an event information table (EIT) of the digital TV stream, when the multimedia content is an MP3 file, the first metadata is stored in an ID3 tag of the MP3 file, when the multimedia content is an MP4 file, the first metadata is stored in a moov atom or a udta atom of the MP4 file, when the multimedia content is a JPEG (Joint Photographic Experts Group) file or TIFF (Tagged Image File Format) file, the first metadata is stored in an EXIF (Exchangeable Image File Format) tag or IPTC (International Press Telecommunications Council) tag of the JPEG file or TIFF file, and when the multimedia content is a PDF (Portable Document Format) file, the first metadata is stored in a metadata stream of the PDF file.

2. The content service system according to claim 1, wherein the content metadata analyzer module obtains the first metadata from the multimedia content or a second widget.

3. The content service system according to claim 1, wherein the widget information acquisition module obtains the widget information from a widget provider according to the widget request or the service metadata.

4. The content service system according to claim 1, wherein the widget administration module obtains the first widget directly from the widget information or from a widget provider according to the widget information.

5. The content service system according to claim 1, wherein the first widget receives a product information from a product provider to display the extended content with the product information.

6. The content service system according to claim 1, wherein the service metadata comprises at least one of a channel number, a program list, a program information, a time, a user preference setting, a network setting, a real-time information, a product information, and the widget information, and the widget information comprises at least one of an ID, a download uniform resource locator (URL), an installation file, a description information, and a classification information.

7. A content service method, comprising:
receiving a multimedia content from a wired network, a wireless network, a wired broadcasting system, a wireless broadcasting system, or a storage medium;
obtaining the first metadata from a receiver for receiving the multimedia content;
receiving a second metadata from a content provider providing the multimedia content according to the first metadata;
analyzing the second metadata to generate the widget request or the service metadata, wherein the first metadata comprises a current time and a channel number;
playing the multimedia content on a player device;
generating a widget request or a service metadata according to a first metadata corresponding to the multimedia content;
obtaining a widget information of a first widget according to the widget request or the service metadata; and
installing and executing the first widget according to the widget information, wherein the first widget plays an extended content corresponding to the multimedia content on the player device,
wherein the multimedia content is in a digital format, and the first metadata is directly stored in the multimedia content, and when the multimedia content is a digital TV stream, the first metadata is stored in an EIT of the digital TV stream, when the multimedia content is an MP3 file, the first metadata is stored in an ID3 tag of the MP3 file, when the multimedia content is an MP4 file, the first metadata is stored in a moov atom or a udta atom of the MP4 file, when the multimedia content is a JPEG file or TIFF file, the first metadata is stored in an EXIF tag or IPTC tag of the JPEG file or TIFF file, and when the multimedia content is a PDF file, the first metadata is stored in a metadata stream of the PDF file.

8. The content service method according to claim 7, further comprising:
obtaining the first metadata from the multimedia content or a second widget.

9. The content service method according to claim 7, further comprising:
obtaining the widget information from a widget provider according to the widget request or the service metadata.

10. The content service method according to claim 7, wherein the first widget is obtained directly from the widget information or from a widget provider according to the widget information.

11. The content service method according to claim 7, further comprising:
the first widget receiving a product information from a product provider so as to display the extended content with the product information.

12. The content service method according to claim 7, wherein the service metadata comprises at least one of a channel number, a program list, a program information, a time, a user preference setting, a network setting, a real-time information, a product information, and the widget information, and the widget information comprises at least one of an ID, a download URL, an installation file, a description information, and a classification information.

13. A non-transitory computer-readable recording medium, for recording a computer program, wherein the computer program executes the content service method according to claim 7.

* * * * *